US012145218B2

(12) United States Patent
Sekiguchi (10) Patent No.: US 12,145,218 B2
(45) Date of Patent: Nov. 19, 2024

(54) FLUX TRANSFER APPARATUS (71) Applicant: SHINKAWA LTD., Tokyo (JP)

(72) Inventor: Shigeyuki Sekiguchi, Tokyo (JP)

(73) Assignee: SHINKAWA LTD., Tokyo (JP)

( * ) Notice: Subject to any disclaimer, the term of this patent is extended or adjusted under 35 U.S.C. 154(b) by 0 days.

(21) Appl. No.: 17/913,162

(22) PCT Filed: Jul. 20, 2021

(86) PCT No.: PCT/JP2021/027096
§ 371 (c)(1),
(2) Date: Sep. 21, 2022

(87) PCT Pub. No.: WO2023/002557
PCT Pub. Date: Jan. 26, 2023

(65) Prior Publication Data
US 2024/0082941 A1 Mar. 14, 2024

(51) Int. Cl.
B23K 3/00 (2006.01)
B23K 3/08 (2006.01)

(52) U.S. Cl.
CPC .................... B23K 3/082 (2013.01)

(58) Field of Classification Search
CPC .............. B23K 3/082; B23K 1/203
USPC ....... 228/207, 223–224, 33, 41, 248.1–248.5
See application file for complete search history.

(56) References Cited

U.S. PATENT DOCUMENTS 5,467,913 A * 11/1995 Namekawa .......... B23K 3/0607
228/41
5,680,984 A * 10/1997 Sakemi ............... H01L 21/4853
118/425
2014/0151437 A1* 6/2014 Choi ...................... H01L 24/81
228/8
2021/0185828 A1 6/2021 Seyama

FOREIGN PATENT DOCUMENTS

| CN | 104070254 A | * | 10/2014 | ........... B23K 1/0053 |
| CN | 104070256 A | * | 10/2014 | ......... B05C 11/1013 |
| CN | 115835929 A | * | 3/2023 | ............... B23K 3/06 |
| JP | H1076210 | | 3/1998 | |
| JP | 2002028776 A | * | 1/2002 | ............. B23K 3/082 |
| JP | 2014159039 | | 9/2014 | |
| KR | 20130090611 A | * | 8/2013 | |
| KR | 20130128921 A | * | 11/2013 | |

(Continued)

OTHER PUBLICATIONS

"International Search Report (Form PCT/ISA/210) of PCT/JP2021/027096," mailed on Oct. 5, 2021, pp. 1-3.

(Continued)

Primary Examiner — Kiley S Stoner
(74) Attorney, Agent, or Firm — JCIPRNET (57) ABSTRACT A flux transfer apparatus (100) includes: a stage (12), having a concave part (13) at a central part; a flux pot (20), having, disposed on a bottom plate (25), a through hole (27) supplying flux (50) to a concave part (13), and reciprocally moving on a surface (14, 15) of the stage (12) to supply the flux (50) to the concave part (13); a detector (30), detecting a remaining amount of the flux (50) stored in the flux pot (20). The detector is disposed on a lower side of the stage (12) or a lateral side of the flux pot (20).

7 Claims, 8 Drawing Sheets (56) References Cited

FOREIGN PATENT DOCUMENTS

| WO | 2016185545 | 11/2016 |
| WO | 2019093232 | 5/2019 |

OTHER PUBLICATIONS

Office Action of Taiwan Counterpart Application, with partial English translation thereof, issued on Apr. 10, 2023, pp. 1-6.
"Office Action of Taiwan Counterpart Application", issued on Aug. 11, 2023, submit with partial English translation thereof, pp. 1-6.

\* cited by examiner

FLUX TRANSFER APPARATUS

CROSS-REFERENCE TO RELATED APPLICATION

This application is a 371 application of the International PCT application serial no. PCT/JP2021/027096, filed on Jul. 20, 2021. The entirety of the above-mentioned patent application is hereby incorporated by reference herein and made a part of this specification.

TECHNICAL FIELD

The disclosure relates to a configuration of a flux transfer apparatus which immerses a transfer target into flux to transfer the flux onto the transfer target, and particularly relates to detecting a remaining amount of flux in a flux pot storing flux.

RELATED ART

In a flux transfer apparatus, when flux transfer is performed, the remaining amount of flux in a flux pot storing flux decreases. Therefore, it is required to detect the remaining amount of flux in the flux pot so that the flux is prevented from being insufficient.

Thus, as described in Patent Literature 1, a method has been proposed to dispose an ultrasonic sensor on the upper side of the flux pot and detect the remaining amount of flux based on ultrasonic waves reflected by the liquid surface of the flux.

CITATION LIST

Patent Literature

[Patent Literature 1] Japanese Laid-open No. 2014-159039

SUMMARY OF INVENTION

Technical Problem

However, in the flux transfer apparatus, a portion of the flux may foam and contaminate the apparatus disposed on the upper side. Therefore, in the conventional technique described in Patent Literature 1, the ultrasonic sensor disposed on the upper side may be contaminated, and it may be difficult to stably detect the remaining amount of flux.

Therefore, an objective of the disclosure is to stably detect the remaining amount of flux.

Solution to Problem

A flux transfer apparatus according to the disclosure includes: a stage, having a concave part at a central part of a surface; a flux pot, having a storage part storing flux, provided with, at a bottom part, a supply part supplying the flux to the concave part, and reciprocally moving on the surface of the stage to supply the flux stored in the flux pot to the concave part through the supply part; and a detector, detecting a remaining amount of the flux stored in the flux pot. The detector is disposed on a lower side of the stage or a lateral side of the flux pot.

Accordingly, since the detector is disposed on the lower side of the stage or the lateral side of the flux pot, the contamination of the detector due to foaming of the flux can be suppressed, and the remaining amount of the flux can be stably detected.

In the flux transfer apparatus of the disclosure, it may also be that the stage includes a light transmission part through which light transmits, the detector is disposed on a lower side of the light transmission part of the stage, and detects the remaining amount of the flux stored in the flux pot based on a light amount of light emitted into the flux stored in the flux pot through the light transmission part and the supply part and reflected by a liquid surface of the flux.

According to such configuration, foamed flux can be suppressed from being attached to the detector, and the remaining amount of the flux can be detected more stably.

In the flux transfer apparatus of the disclosure, it may also be that the flux pot returns to an initial position on a periphery of the concave part at a time of transferring the flux, and the light transmission part is installed to an initial position of the stage.

According to such configuration, since the remaining amount of the flux is detected in a state in which the flux pot is stopped at the initial position, the remaining amount of the flux can be detected stably.

In the flux transfer apparatus of the disclosure, it may also be that the detector includes a light emission part and a light reception part, the light emission part emits light into the flux stored in the flux pot through the light transmission part and the supply part, and the light reception part measures a light amount of light reflected by the liquid surface of the flux and transmitted through the light transmission part and the supply part.

Accordingly, the remaining amount of the flux of the flux pot can be detected by using a simple configuration.

In the flux transfer apparatus of the disclosure, it may also be that the flux pot includes light transmission wall parts through which light transmits on opposite sidewalls, the detector is disposed on the lateral side of the flux pot, and detects the remaining amount of the flux stored in the flux pot based on a light amount of transmitted light transmitted through the flux pot through each of the light transmission wall parts.

According to such configuration, foamed flux can be suppressed from being attached to the detector, and the remaining amount of the flux can be detected more stably.

In the flux transfer apparatus of the disclosure, it may also be that the light transmission wall parts are respectively provided on two opposite sidewalls in a reciprocal movement direction of the flux pot, the detector is formed by a light emitter disposed on an end side in the reciprocal movement direction outer of a reciprocal movement range of the flux pot and a light receiver disposed on an other end side.

Accordingly, even in the case where the flux pot is moved reciprocally, the remaining amount of the flux can be detected.

In the flux transfer apparatus of the disclosure, it may also be that the light transmission wall parts are respectively provided on two opposite sidewalls in a direction orthogonal to a reciprocal movement direction of the flux pot, the detector is formed by a light emitter disposed to be spaced apart from the flux pot and on a side in the direction orthogonal to the reciprocal movement direction of the flux pot and a light receiver disposed on an other side.

Accordingly, the remaining amount of the flux of the flux pot can be detected by using a simple configuration.

In the flux transfer apparatus of the disclosure, it may also be that multiple detectors are disposed in a height direction.

Accordingly, the remaining amount of the flux can be more specifically detected.

Effects of Invention

The disclosure is capable of stably detecting the remaining amount of flux.

DESCRIPTION OF EMBODIMENTS

Figure 1:
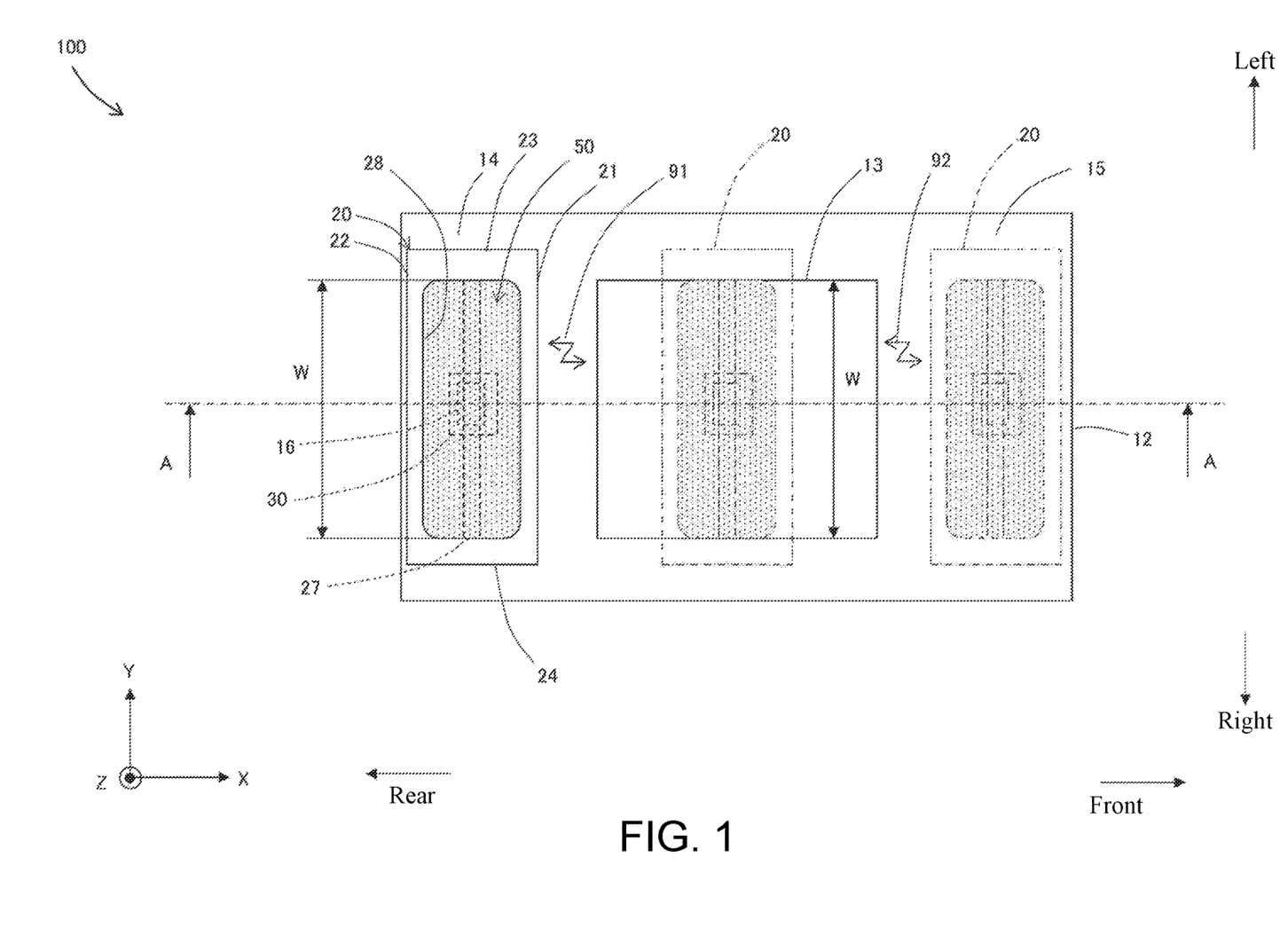
FIG. 1 is a plan view of a flux transfer apparatus according to an embodiment.
Figure 2:
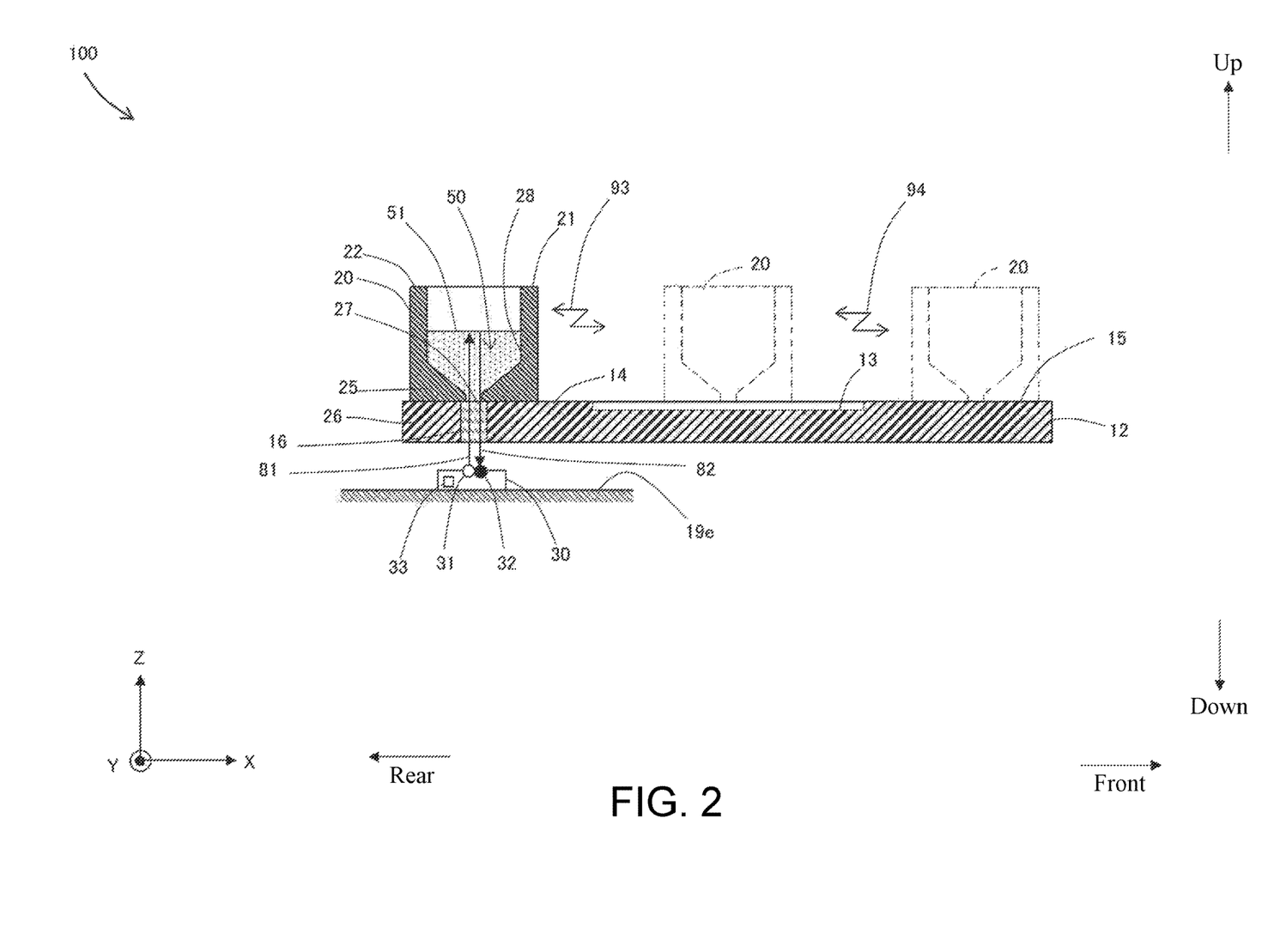
FIG. 2 is a cross-sectional view of the flux transfer apparatus according to the embodiment, and is taken along an A-A cross-section of FIG. 1.

In the following, a flux transfer apparatus 100 of an embodiment is described with reference to the drawings. As shown in FIGS. 1 and 2, the flux transfer apparatus 100 includes a stage 12, a flux pot 20, and a detector 30. The stage 12 has a concave part 13 collecting flux 50. The flux pot 20 stores the flux 50 in an inner part 28 and supplies the stored flux 50 to the concave part 13. The detector 30 detects the remaining amount of the flux 50 stored in the flux pot 20. The flux pot 20 is moved reciprocally in the X direction as indicated by arrows 91 to 94 shown in FIGS. 1 and 2 by using a driving mechanism not shown herein. The flux transfer apparatus 100 immerses a transfer target, such as a protrusive electrode of an electronic component, into the flux 50 collected in the concave part 13 to transfer the flux 50 onto the transfer target. In the following, the descriptions are made by setting the direction in which the flux pot 20 moves reciprocally as the X direction, a direction perpendicular to the X direction as the Y direction, the up-down direction as Z direction, the side where the detector 30 is disposed as a X-direction negative side or the rear, the opposite direction as a X-direction positive side or the front, a Y-direction positive side as a left direction, a Y-direction negative side as a right direction, a Z-direction positive side as an upper direction, and a Z-direction negative side as a lower direction.

As shown in FIGS. 1 and 2, the stage 12 has the concave part 13 at the central part. The concave part 13 is recessed from surfaces 14, 15, and collects the flux 50. The concave part 13 extends, in a width W, along a reciprocal movement direction (X direction). The depth of the concave part 13 is so deep that the transfer target, such as a protrusive electrode of an electronic component, can be immersed, such as about 10 to 20 µm. The stage 12 is installed to a base (not shown) supporting the entire flux transfer apparatus 100.

The flux pot 20 is an open, box-shaped member in a rectangular shape whose top surface is open, and is formed by a front wall 21, a rear wall 22, a left wall 23, a right wall 24, and a bottom plate 25. In the flux pot 20, the width of the inner surface is the same as the width of the concave part 13 as W. On the bottom plate 25, a through hole 27 in a slit shape extending in a width direction parallel to the front wall 21 and the rear wall 22 is provided. The front wall 21 and the rear wall 22 are opposite sidewalls in the reciprocal movement direction of the flux pot 20, and the left wall 23 and the right wall 24 are opposite sidewalls in a direction orthogonal to the reciprocal direction of the flux pot 20. The flux pot 20 stores the flux 50 in the inner part 28, supplies the flux 50 to the concave part 13 of the stage 12 from the through hole 27 when the flux pot 20 is moved reciprocally in the X direction by the driving mechanism not shown herein, and smooths the surface of the flux 50 supplied to the concave part 13 by using a bottom surface 26 of the bottom plate 25. Accordingly, the through hole 27 forms a supply part provided at the bottom of the flux pot 20 and supplying the flux 50 stored in the inner part 28 which is a storage part of the flux pot 20 to the concave part 13.

As shown in FIGS. 1 and 2, in the initial state, the flux pot 20 is stopped at an initial position on the upper side of the surface 14 behind the concave part 13. A light transmission part 16 that allows light to pass through in the thickness direction of the stage 12 is provided at the position of the stage 12 corresponding to the through hole 27 of the flux pot 20 when the flux pot 20 is at the initial position. The light transmission part 16 is formed by a light transmissive material, such as glass, and may be fit into an installation hole provided at the stage 12 to be liquid-tight. The light transmission part 16, for example, may be provided at the center of the stage 12 or the flux pot 20 in the width direction, and may also be disposed at a position deviated leftward or rightward from the center.

A lower base part 19e, which is a portion of the base supporting the stage 12 is disposed on the lower side of the stage 12. The detector 30 detecting the remaining amount of the flux 50 stored in the flux pot 20 is installed onto the lower base part 19e at the position corresponding to the light transmission part 16 provided at the stage 12. The detector 30 includes a light emission part 31, a light reception part 32, and a computation circuit 33 converting a light amount of reflected light from a liquid surface 51 of the flux 50 as detected by the light reception part 32 into the remaining amount of the flux 50.

Here, an operation of the flux transfer apparatus 100 with the above configuration is described briefly.

As described above, in the initial state, the flux pot 20 is stopped at the initial position on the upper side of the surface 14 behind the concave part 13. In such state, a predetermined amount of the flux 50 is filled into the inner part 28 of the flux pot 20, and the liquid surface 51 of the flux 50 is at a predetermined height. At this time, the bottom surface 26 of the flux pot is in close contact with the surface 14 of the stage 12, so the flux 50 does not flow out from the through hole 27 and is held in the inner part 28 of the flux pot 20. In addition, the light transmission part 16 is fit into the installation hole provided at the stage 12 to be liquid-tight, so the flux 50 does not leak from the periphery of the light transmission part 16 to the lower side of the stage 12.

Then, by using the driving mechanism not shown herein, the flux pot 20 is moved toward the X-direction positive side. When the through hole 27 of the flux pot 20 arrives at the above of the concave part 13, the flux 50 filled into the through hole 27 drops into the concave part 13 of the stage 12. The flux 50 having dropped into the concave part 13 is smoothed by the bottom surface of the flux pot 20, and the flux 50 is thus substantially as deep as the concave part 13. The flux pot 20 reciprocally moves in the X direction above the concave part 13 for several times, so that the entire concave part 13 is filled by the flux 50 with a uniform thickness. Then, when the concave part 13 is filled with the flux 50, the driving mechanism not shown herein drives the flux pot 20 back to the initial position.

Then, the flux transfer apparatus 100 sucks the electronic component to a tip of a bonding head not shown herein, and immerses the protrusive electrode of the electronic component into the flux 50 collected in the concave part 13 to transfer the flux 50 to the protrusive electrode.

In this way, when the flux 50 stored in the inner part 28 is supplied to the concave part 13 by reciprocally moving the flux pot 20 in the X direction, the remaining amount of the flux 50 of the flux pot 20 gradually decreases, and the liquid surface 51 of the flux 50 gradually lowers.

Then, an operation of detecting the remaining amount of the flux 50 of the flux transfer apparatus 100 is described.

As described above, the flux pot 20 is stopped at the initial position on the upper side of the surface 14 behind the concave part 13. In addition, the through hole 27 of the flux pot 20 is overlapped above the light transmission part 16.

When light is emitted from the light emission part 31 of the detector 30 in such state, as shown by an arrow 81 of FIG. 2, the emitted light is emitted into the flux 50 stored in the inner part 28 of the flux pot 20 through the light transmission part 16 of the stage 12 and the through hole 27 of the flux pot 20. Then, as indicated by an arrow 82 of FIG. 2, the light is reflected by the liquid surface 51 of the flux 50 and emitted into the light reception part 32 through the through hole 27 of the flux pot 20 and the light transmission part 16 of the stage 12. The detector 30 measures the light amount of the reflected light emitted into the light reception part 32.

Figure 3:
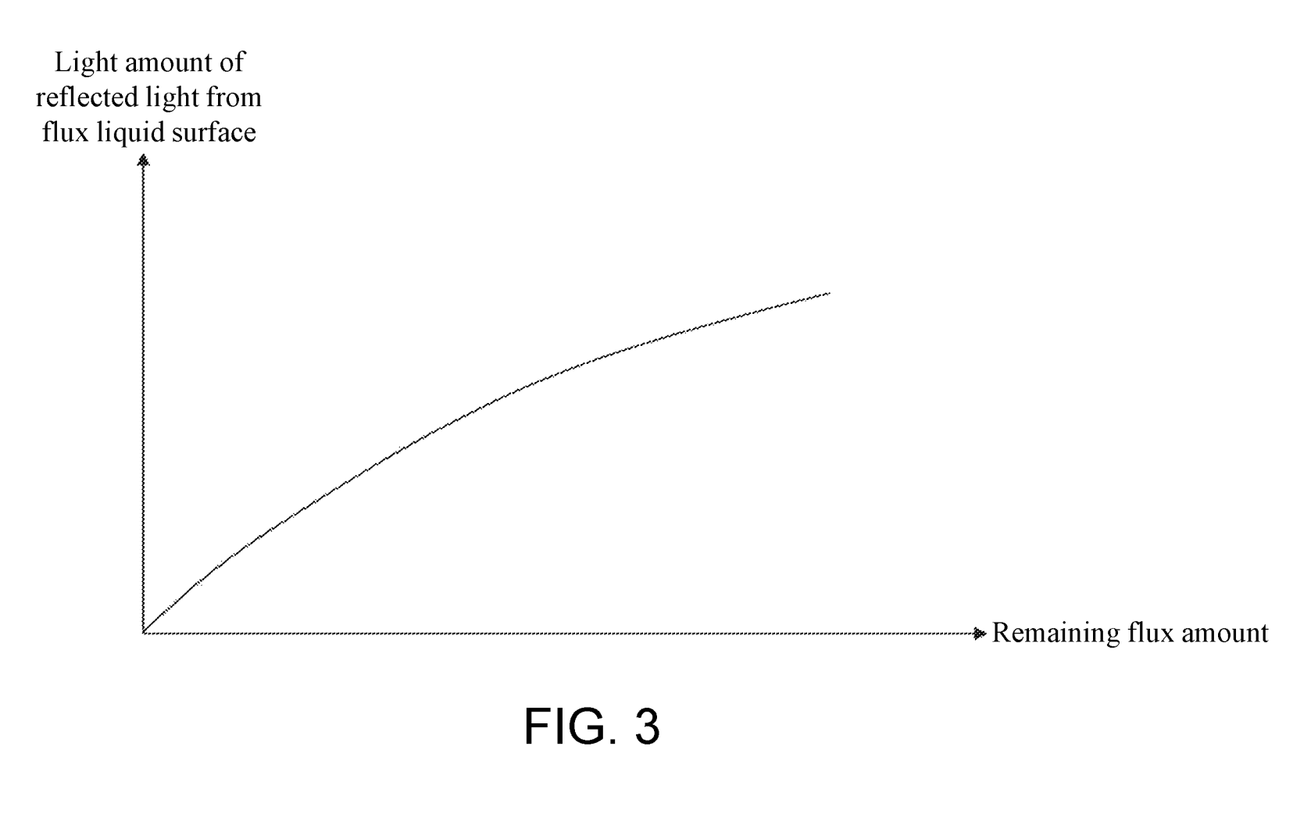
FIG. 3 is a graph illustrating a relationship between a remaining amount of flux in a flux pot of the flux transfer apparatus according to the embodiment and a light amount of reflected light from a liquid surface of the flux.

A relationship between the remaining amount of the flux 50 and the light amount of the reflected light is as shown in FIG. 3. When the remaining amount of the flux 50 increases, the height of the liquid surface 51 of the flux 50 stored in the inner part 28 of the flux pot 20 increases, and the light amount of the reflected light increases. Then, when the remaining amount decreases and the height of the liquid surface 51 decreases, the light amount of the reflected light gradually decreases. When the remaining amount becomes zero and there is no liquid surface 51, the light amount of the reflected light becomes zero.

The detector 30 stores the graph shown in FIG. 3 in the computation circuit 33, and coverts the light amount of the reflected light from the liquid surface 51 of the flux 50 detected by the light reception part 32 into the remaining amount of the flux 50 based on the graph shown in FIG. 3 and outputs the remaining amount.

Figure 4:
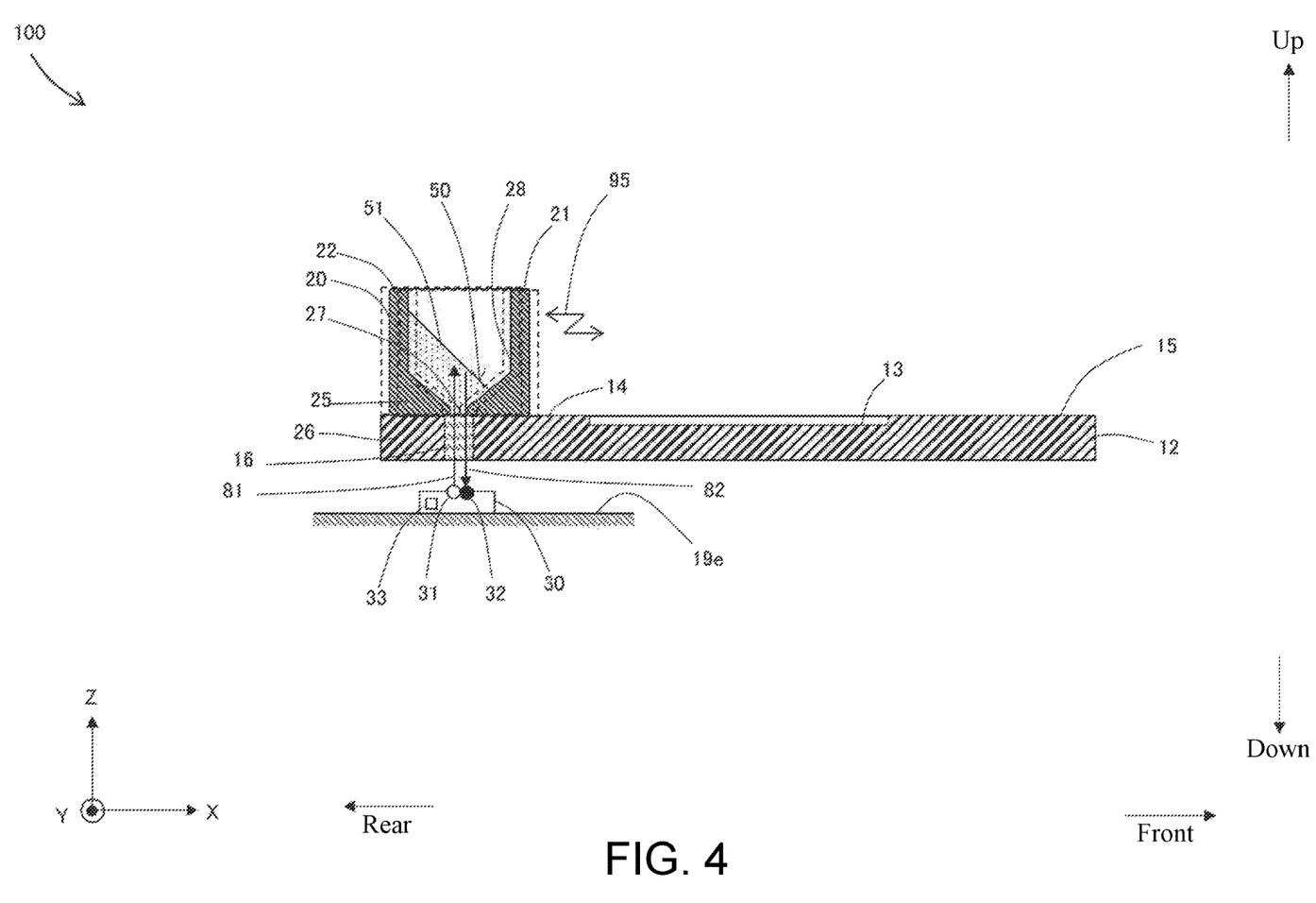
FIG. 4 is a view illustrating a shaking operation of the flux pot on the A-A cross-section of FIG. 1.

It is noted that, when the flux pot 20 returns to the initial position after being operated reciprocally in the X direction, the liquid surface 51 of the flux 50 may be tilted as shown in FIG. 4. In such case, as indicated by the broken line and an arrow 95 in FIG. 4, the driving mechanism not shown herein may shake the flux pot 20 in the X direction several times to make the liquid surface 51 level, thereby detecting the remaining amount of the flux 50 by using the detector 30.

Then, if the flux transfer apparatus 100 receives a signal from the detector 30 indicating that the remaining amount of the flux 50 has dropped to an amount that requires to replace the flux pot 20 or fill the flux 50, the flux transfer apparatus 100 may output an alarm to notify the operator that the flux pot 20 needs to be replaced, or the flux 50 needs to be filled. While checking the alarm, the operator may replace the flux pot 20 with a new one filled with a predetermined amount of the flux 50, and may also fill the flux 50 into the flux pot 20.

In the flux transfer apparatus 100 of the embodiment described above, the detector 30 detecting the remaining amount of the flux 50 is disposed on the lower side of the stage 12, so the detector 30 is not contaminated by the flux 50 due to foaming of the flux 50. In addition, the light transmission part 16 is fit into the installation hole provided at the stage 12 to be liquid-tight, so the flux 50 does not leak from the periphery of the light transmission part 16 to the lower side of the stage 12. Therefore, the flux 50 does not contaminate the detector 30, and the remaining amount of the flux 50 can be detected stably.

In addition, in the flux transfer apparatus 100 of the embodiment, the light emitted from the detector 30 disposed on the lower side of the stage 12 is emitted to the flux 50 stored in the inner part 28 of the flux pot 20 through the light transmission part 16, and the remaining amount of the flux 50 is detected based on the light amount of the reflected light reflected by the liquid surface 51 and the graph shown in FIG. 3. Therefore, in addition to detecting whether the remaining amount of the flux 50 is in the amount that requires replacement of the flux pot 20 or filling of the flux 50, it is also possible to detect the level of the remaining amount and thus predict the time at which the flux pot 20 is to be replaced or the flux 50 is to be filled.

In the above description, the light transmission part 16 is described as being provided at the position of the stage 12 corresponding to the through hole 27 of the flux pot 20 when the flux pot 20 is at the initial position on the surface 14 behind the concave part 13 of the stage 12. However, the invention is not limited thereto. For example, the light transmission part 16 may also be provided at a position of the stage 12 corresponding to the through hole 27 of the flux pot 20 when the flux pot 20 is on the surface 15 in front of the concave part 13 of the stage 12.

Also, in the above description, the detector 30 is installed to the lower base part 19e on the lower side of the stage 12. However, the invention is not limited thereto. The detector 30 may also be installed to another part, such as being installed to the lower surface of the stage 12, as long as it is installed to a part connected with the base supporting the stage 12.

Moreover, in the above description, the detector 30 stores the graph shown in FIG. 3 in the computation circuit 33, and converts the light amount of the reflected light reflected from the liquid surface 51 of the flux 50 detected by the light reception part 32 into the remaining amount of the flux 50 and outputs the remaining amount. However, the invention is not limited thereto. For example, it may also be that the detector 30 does not include the computation circuit 33, but outputs the light amount of the reflected light detected by the light reception part 32, the graph shown in FIG. 3 is stored in a control apparatus (not shown) of the flux transfer apparatus 100, and the remaining amount of the flux 50 is calculated from the light amount of the reflected light to display an alarm.

Also, it may also be that the detector 30 does not include the computation circuit 33, but a flux remaining amount display apparatus (not shown) is provided separately, the graph shown in FIG. 3 is stored in the flux remaining amount display apparatus, and the remaining amount of the flux 50 is calculated from the light amount of the reflected light and the remaining amount is displayed on the display.

Moreover, the detector 30 is described as including the light emission part 31 and the light reception part 32. However, the light emission part and the light reception part may be disposed independently to form the detector 30.

In addition, in the above description, the flux pot 20 is an open, box-shaped member in a rectangular shape whose upper surface is open, and the slit-like through hole 27 supplying the flux 50 to the concave part 13 is provided on the bottom plate. However, the invention is not limited thereto. For example, the flux pot 20 may also be provided with a lid or in a circular cylindrical shape or a polygonal shape. Also, the flux pot 20 may also be a replaceable syringe that is translucent or transparent. In addition, the flux pot 20 may also be an annular member having a through opening having the same opening area on the top and the bottom surface. In such case, the lower end of the through opening is formed as the supply part provided at the bottom part of the flux pot 20 and supplying the flux 50 stored in the inner part 28 of flux pot 20 to the concave part 13.

Then, a flux transfer apparatus 200 of another embodiment is described with reference to FIGS. 5 to 7. Parts same as those of the flux transfer apparatus 100 having been described with reference to FIGS. 1 to 4 are labeled with the same reference symbols, and the descriptions are omitted.

Figure 5:
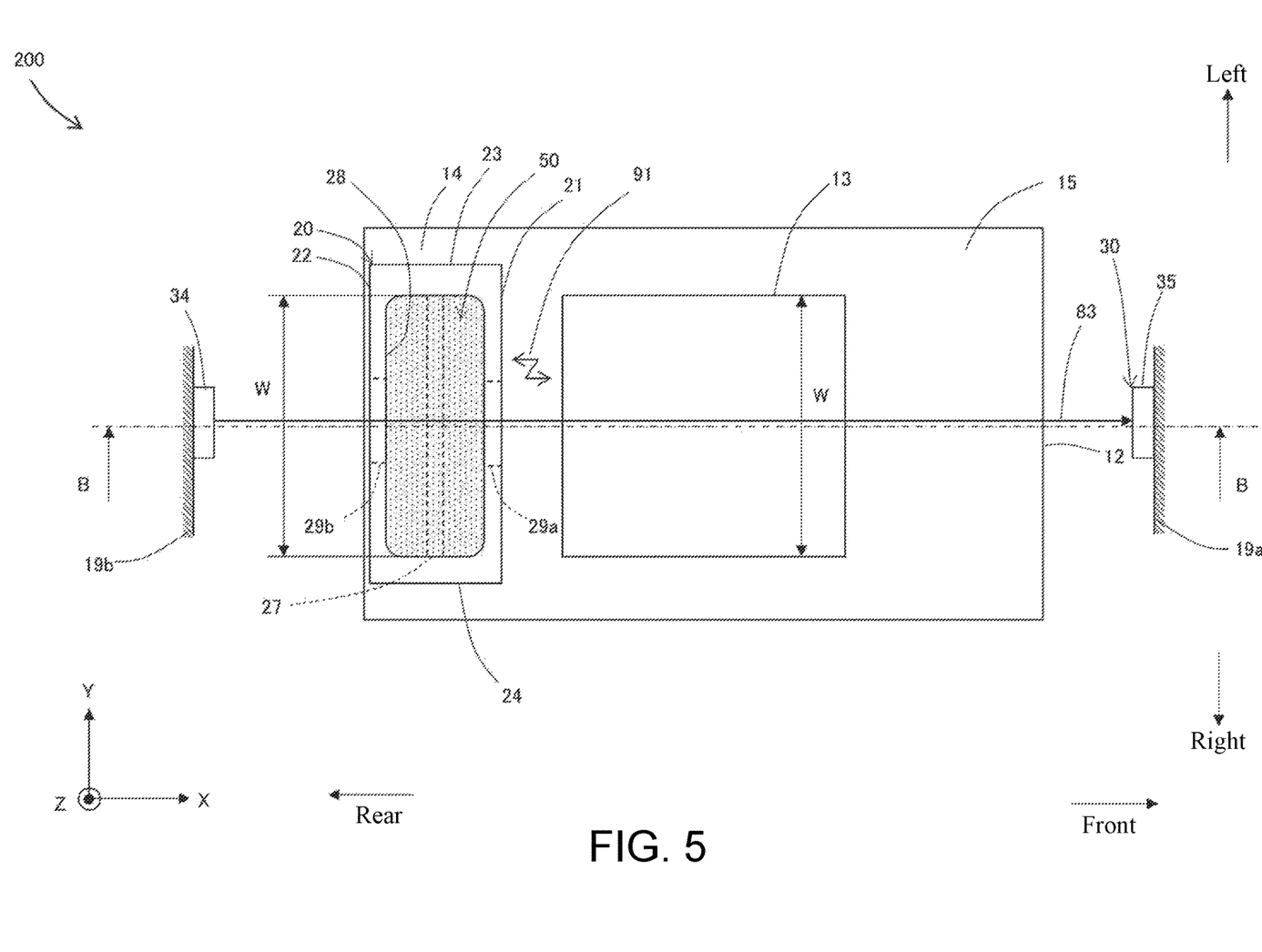
FIG. 5 is a plan view of a flux transfer apparatus according to another embodiment.
Figure 6:
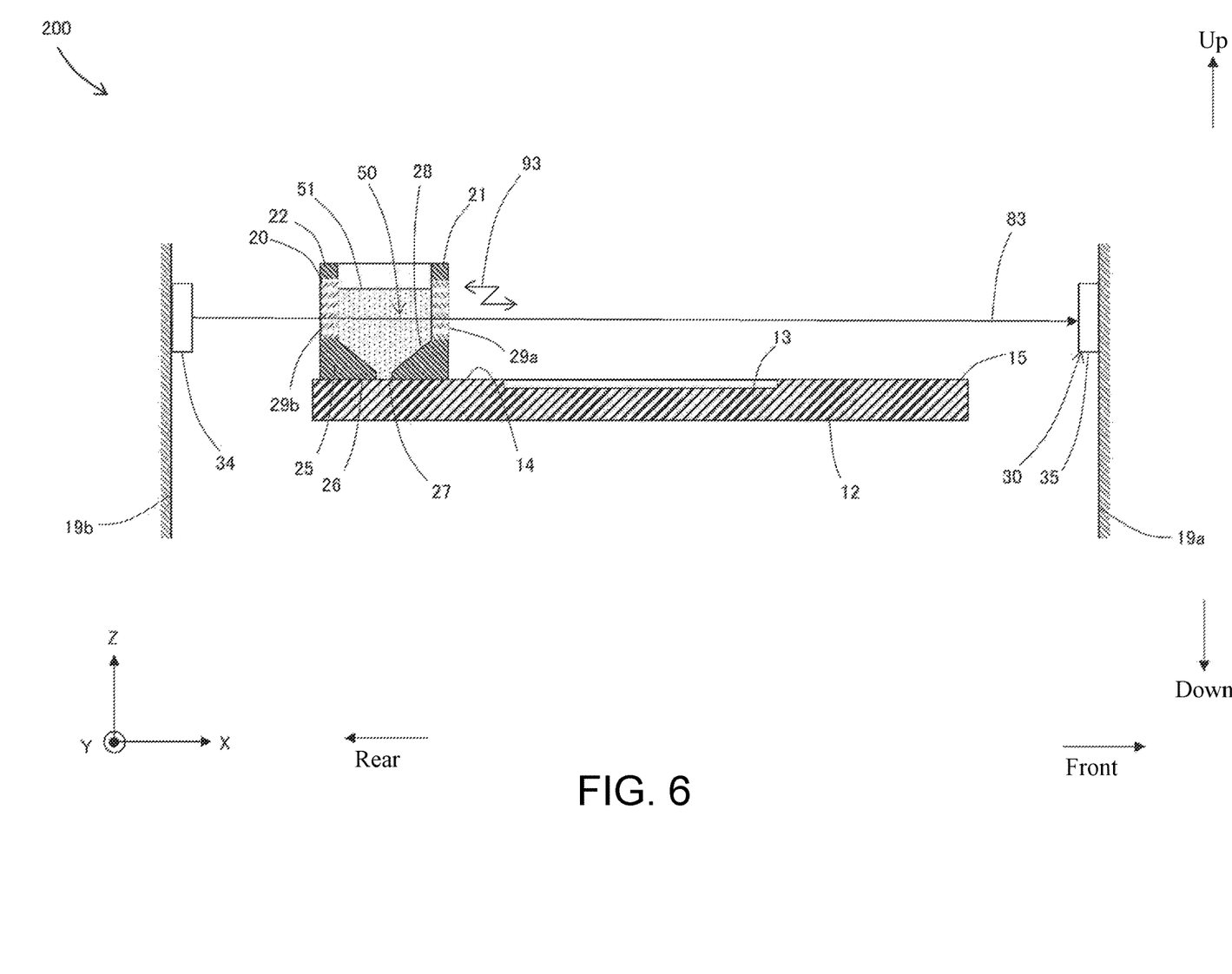
FIG. 6 is a cross-sectional view of the flux transfer apparatus according to the another embodiment, and is taken along a B-B cross-section of FIG. 5.

As shown in FIGS. 5 and 6, in the flux transfer apparatus 200, a front light transmission wall part 29a and a rear light transmission wall part 29b are respectively provided on the front wall 21 and the rear wall 22 of the flux pot 20, and the detector 30 is configured to have a light emitter 34 disposed on the rear side and a light receiver 35 disposed on the front side.

As shown in FIGS. 5 and 6, on the front wall 21 and the rear wall 22 as the opposite side walls in the reciprocal movement direction of the flux pot 20, the front light transmission wall part 29a and the rear light transmission wall part 29b allowing light to pass through in the thickness direction of the front wall 21 and the rear wall 22 are provided. The front light transmission wall part 29a and the rear light transmission wall part 29b are, for example, formed by a light transmissive material, such as glass, and are respectively fit into installation holes provided on the front wall 21 and the rear wall 22 to be liquid-tight. It suffices as long as the front light transmission wall part 29a and the rear light transmission wall part 29b are arranged in the X direction. For example, the front light transmission wall part 29a and the rear light transmission wall part 29b may be provided at the center of the stage 12 or the flux pot 20 in the width direction, and may also be disposed at a position deviated leftward or rightward from the center.

A front base part 19a and a rear base part 19b as portions of the base supporting the stage 12 are disposed on the front side and the rear side of the stage 12 that are outer of the reciprocal movement range of the flux pot 20. Here, the rear side of the stage 12 is an end side of the flux pot 20 in the reciprocal movement direction, and the front side of the stage 12 is the other end side of the flux pot 20 in the reciprocal movement direction.

The light emitter 34 emitting light is installed to the rear base part 19b, and the light receiver 35 receiving the light emitted from the light emitter 34 and outputting the light amount of the received light is installed to the front base part 19a. The light emitter 34 and the light receiver 35 are installed so as to face the front light transmission wall part 29a and the rear light transmission wall part 29b provided at the flux pot 20 and so as to be at the same positions in the width direction and at the same height with the front light transmission wall part 29a and the rear light transmission wall part 29b. The light receiver 35 detects the light amount of the transmitted light transmitted through the flux pot 20 through the front light transmission wall part 29a and the rear light transmission wall part 29b.

Then, a principle of detecting the remaining amount of the flux 50 of the flux transfer apparatus 200 is described.

The light emitted from the light emitter 34 disposed behind the reciprocal movement range of the flux pot 20, like a light path 83 indicated by the arrows in FIGS. 5 and 6, passes through the rear light transmission wall part 29b to transmit through the flux 50 stored in the inner part 28 of the flux pot 20 and is emitted to the outside through the front light transmission wall part 29a and into the light receiver 35 disposed on the front side with respect to the reciprocal movement range of the flux pot 20.

When the remaining amount of the flux 50 is large, and the liquid surface 51 is above the light path 83 of the light emitted from the light emitter 34, the light emitted from the light emitter 34 is absorbed by the flux 50 stored in the inner part 28 of the flux pot 20. Therefore, the light amount of the transmitted light detected by the light receiver 35 is decreased. Meanwhile, when the liquid surface 51 is below the light path 83 of the light emitted from the light emitter 34, since the light emitted from the light emitter 34 is not transmitted through the flux 50 stored in the inner part 28 of the flux pot 20, the light amount of the transmitted light detected by the light receiver 35 is increased.

Figure 7:
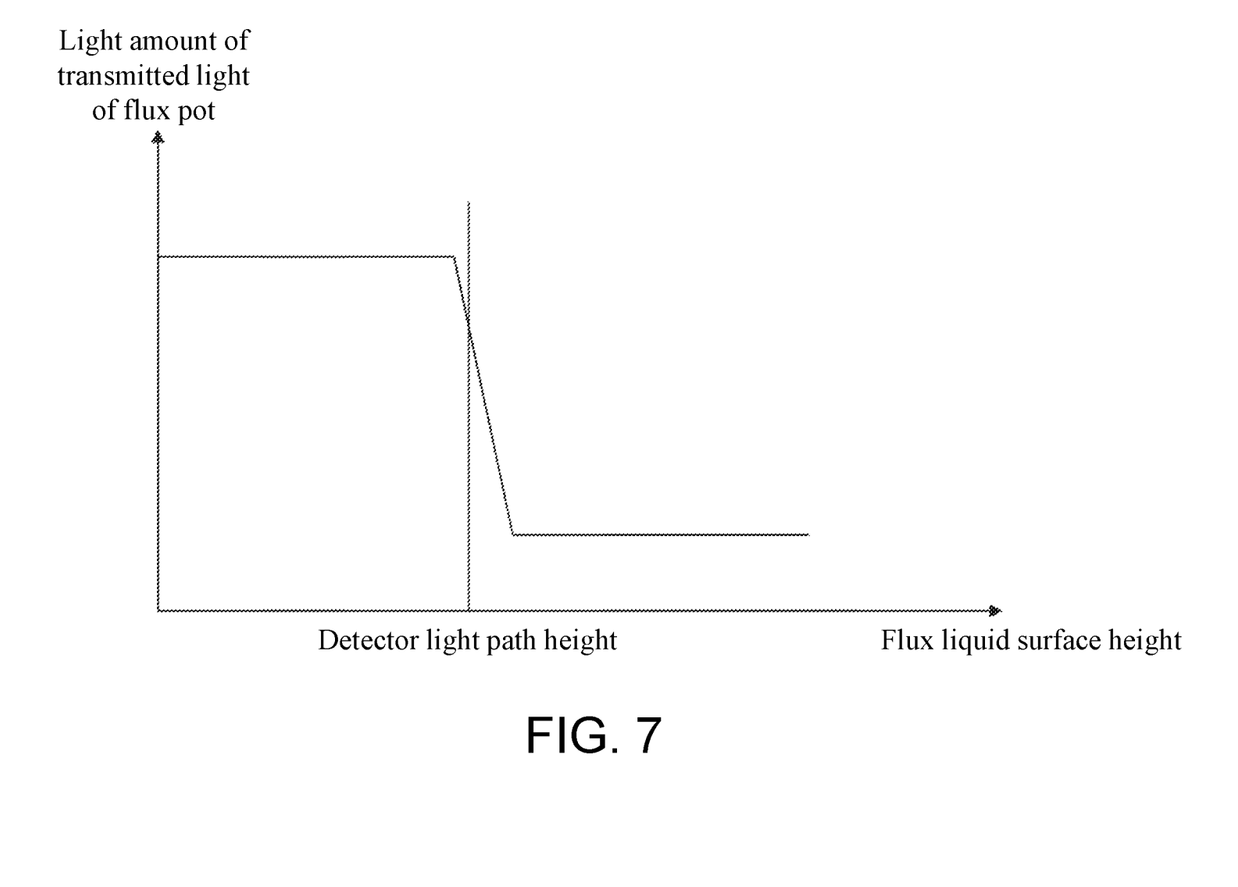
FIG. 7 is a graph illustrating a relationship between a liquid surface height of flux of the flux transfer apparatus according to the another embodiment and a light amount of transmitted light of the flux pot.

Therefore, as shown in FIG. 7, in the case where the liquid surface 51 of the flux 50 is higher than the light path 83 of the detector 30, the light amount of the transmitted light detected by the light receiver 35 is reduced, and in the case where the liquid surface 51 of the flux 50 is lower than the light path 83 of the detector 30, the light amount of the transmitted light detected by the light receiver 35 is increased. Therefore, in the case where the light amount of the transmitted light detected by the light receiver 35 is greater than a predetermined threshold, it can be detected that the liquid surface 51 of the flux 50 is lower than the light path 83 of the detector 30, the remaining amount of the flux 50 is decreased, and the flux pot 20 needs to be replaced or the flux 50 needs to be filled.

Therefore, in the case where a signal of the light amount of the transmitted light input from the light receiver 35 is greater than a predetermined threshold, the control apparatus (not shown) of the flux transfer apparatus 200 may determine that it is necessary to replace the flux pot 20 or fill the flux 50 and display an alarm. In addition, it may also be that a flux remaining amount display apparatus (not shown) is separately provided, and in the case where the signal input from the light receiver 35 to the flux remaining amount display apparatus is greater than or equal to the predetermined threshold, an alarm is displayed.

In the flux transfer apparatus 200 of the embodiment, since the detector 30 formed by the light emitter 34 and the light receiver 35 is disposed ahead of and behind the flux pot 20, the flux 50 does not contaminate the detector 30 due to foaming of the flux 50, and the remaining amount of the flux 50 can be detected stably.

In addition, in the flux transfer apparatus 200 of the embodiment, since the light emitter 34 and the light receiver 35 are disposed outer of the reciprocal movement range of the flux pot 20, whether the remaining amount of the flux 50 stored in the inner part 28 of the flux pot 20 reaches an amount requiring replacement can be detected, regardless of the X-direction position of the flux pot 20.

It is noted that, in the above description, it is described that the detector 30 detects the remaining amount of the flux 50 by using one light path 83 from the light receiver 34 to the light receiver 35. However, the invention is not limited thereto. For example, it may be configured to include multiple light paths 83 in the up-down direction formed by multiple detectors 30 arranged, in the up-down direction, by using multiple light emitters 34 and light receivers 35 arranged in the up-down direction. Accordingly, the change of the remaining amount of the flux pot 20 can be detected.

Also, in the above description, it is described that the flux pot 20 is provided with the front light transmission wall part 29a and the rear light transmission wall part 29b allowing light to pass through in the thickness direction of the front wall 21 and the rear wall 22. However, the invention is not limited thereto. The entire flux pot 20 may also be formed by a transparent, light-transmissive material.

Then, a flux transfer apparatus 300 of another embodiment is described with reference to FIG. 8. Parts same as those of the flux transfer apparatus 200 having been described with reference to FIGS. 5 to 7 are labeled with the same reference symbols, and the descriptions are omitted.

Figure 8:
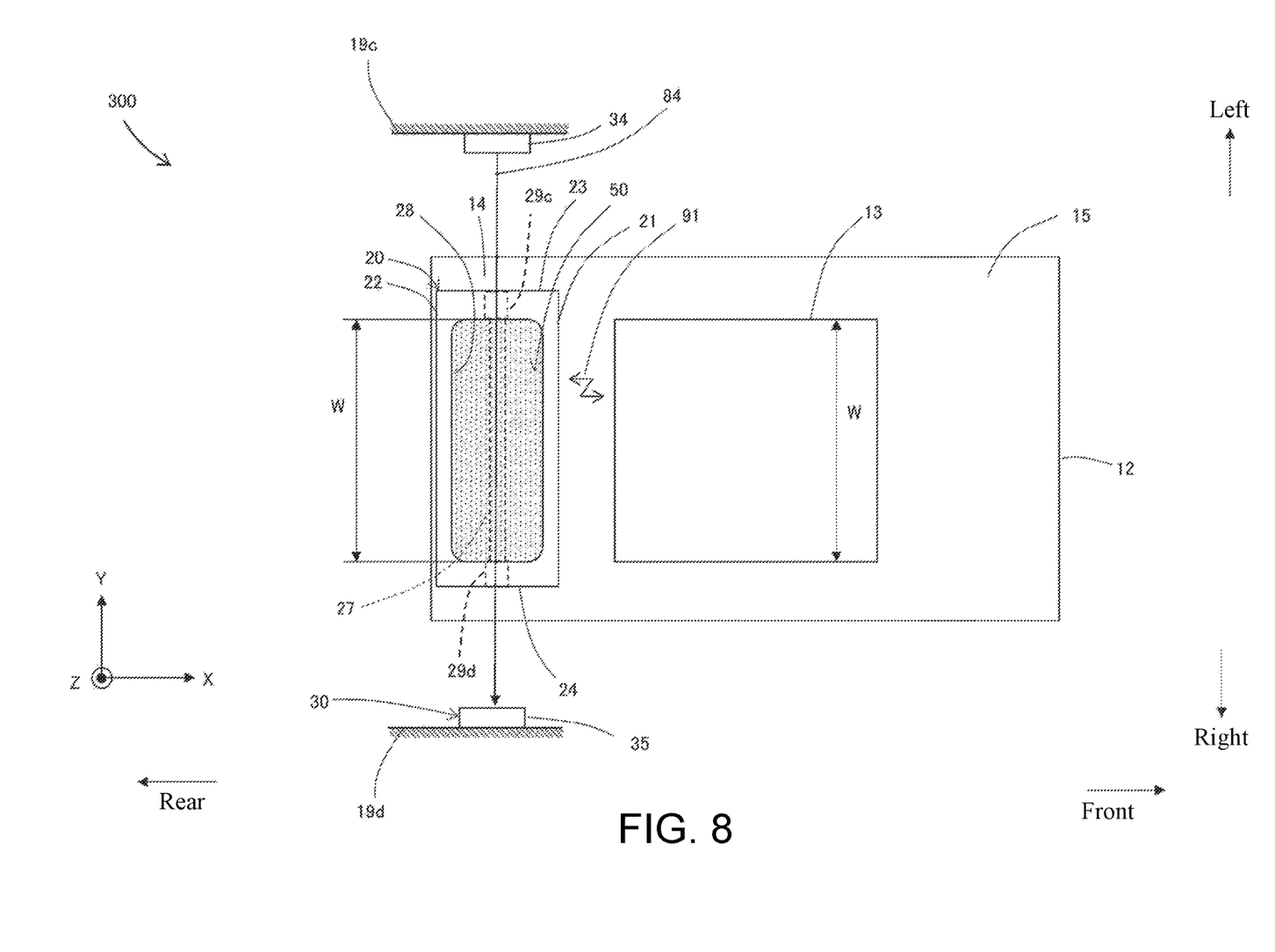
FIG. 8 is a plan view of a flux transfer apparatus according to another embodiment.

As shown in FIG. 8, in the flux transfer apparatus 300, a left light transmission wall part 29c and a right light transmission wall part 29d are respectively provided on the left wall 23 and the right wall 24 of the flux pot 20, and the detector 30 is configured to have the light emitter 34 disposed on the left side and the light receiver 35 disposed on the right side.

On the left side of the flux pot 20, which is the Y-direction positive side, a left base part 19a as a portion of the base supporting the stage 12 is disposed. In addition, on the right side, which is the Y-direction negative side, a right base part 19d is disposed. Here, the Y-direction positive side is a side in a direction orthogonal to the reciprocal movement direction, and the Y-direction negative side is the other side in the direction orthogonal to the reciprocal movement direction.

On the left base part 19c, the light emitter 34 is disposed at a location spaced apart from the left wall 23 of the flux pot 20. In addition, on the right base part 19d, the light receiver 35 is disposed to be spaced apart from the right wall 24 of the flux pot 20.

The light emitter 34 and the light receiver 35 are disposed at positions respectively facing the left light transmission wall part 29c and the right light transmission wall part 29d provided in the flux pot 20 when the flux pot 20 is at the initial position.

Like the flux transfer apparatus 200 having been described with reference to FIGS. 5 to 7, the light emitter 34 emits light traveling along a light path 84, and the light passing through the left light transmission wall part 29c and the right light transmission wall part 29d of the flux pot 20 is emitted into the light receiver 35. The light receiver 35 detects the light amount of the transmitted light, and can detect whether the liquid surface 51 of the flux 50 is lower than the light path 84 of the detector 30 based on whether the light amount of the transmitted light detected by the light receiver 35 is greater than a predetermined threshold.

In the flux transfer apparatus 300 of the embodiment, since the detector 30 formed by the light emitter 34 and the light receiver 35 is disposed on the left and the right of the flux pot 20, the flux 50 does not contaminate the detector 30 due to foaming of the flux 50, and the remaining amount of the flux 50 can be detected stably.

Also, in the above description, it is described that the flux pot 20 is provided with, on the left wall 23 and the right wall 24, the left light transmission wall part 29c and the right light transmission wall part 29d allowing light to respectively pass through. However, the invention is not limited thereto. The entire flux pot 20 may also be formed by a transparent, light-transmissive material.

What is claimed is:

1. A flux transfer apparatus, comprising:
   a stage, having a concave part at a central part of a surface;
   a flux pot, having a storage part storing flux, provided with, at a bottom part, a supply part supplying the flux to the concave part, and reciprocally moving on the surface of the stage to supply the flux stored in the flux pot to the concave part through the supply part; and
   a detector, detecting a remaining amount of the flux stored in the flux pot,
   wherein the stage comprises a light transmission part through which light transmits,
   the detector is disposed on a lower side of the light transmission part of the stage, and detects the remaining amount of the flux stored in the flux pot based on a light amount of light emitted into the flux stored in the flux pot through the light transmission part and the supply part and reflected by a liquid surface of the flux,
   wherein the detector comprises a light emission part and a light reception part that are both disposed under the lower side of the light transmission part of the stage with respect to the flux pot.

2. The flux transfer apparatus as claimed in claim 1, wherein the flux pot returns to an initial position on a periphery of the concave part at a time of transferring the flux, and
   the light transmission part is installed to the initial position of the stage.

3. The flux transfer apparatus as claimed in claim 1, wherein
   the light emission part emits light into the flux stored in the flux pot through the light transmission part and the supply part, and
   the light reception part measures a light amount of light reflected by the liquid surface of the flux and transmitted through the light transmission part and the supply part.

4. A flux transfer apparatus, comprising:
   a stage, having a concave part at a central part of a surface;
   a flux pot, having a storage part storing flux, provided with, at a bottom part, a supply part supplying the flux to the concave part, and reciprocally moving on the surface of the stage to supply the flux stored in the flux pot to the concave part through the supply part; and
   a detector, detecting a remaining amount of the flux stored in the flux pot,
   wherein the flux pot comprises light transmission wall parts through which light transmits on opposite sidewalls,
   the detector is disposed on a lateral side of the flux pot, and detects the remaining amount of the flux stored in the flux pot based on a light amount of transmitted light transmitted through the flux pot through each of the light transmission wall parts.

5. The flux transfer apparatus as claimed in claim 4, wherein the light transmission wall parts are respectively provided on two opposite sidewalls in a reciprocal movement direction of the flux pot, and
   the detector is formed by a light emitter disposed on an end side in the reciprocal movement direction outer of a reciprocal movement range of the flux pot and a light receiver disposed on an other end side.

6. The flux transfer apparatus as claimed in claim 4, wherein the light transmission wall parts are respectively provided on two opposite sidewalls in a direction orthogonal to a reciprocal movement direction of the flux pot, and the detector is formed by a light emitter disposed to be spaced apart from the flux pot and on a side in the direction orthogonal to the reciprocal movement direction of the flux pot and a light receiver disposed on an other side.

7. The flux transfer apparatus as claimed in claim 4, wherein a plurality of detectors are disposed in a height direction.

* * * * *